United States Patent [19]
Yai

[11] Patent Number: 5,813,161
[45] Date of Patent: Sep. 29, 1998

[54] AUTOMATIC FISH HOOK SETTING ASSEMBLY

[76] Inventor: Hyunsoo Yai, 9003 Scott St., Springfield, Va. 22153

[21] Appl. No.: 795,558

[22] Filed: Feb. 6, 1997

[51] Int. Cl.⁶ .................................................... A01K 91/10
[52] U.S. Cl. ...................................................... 43/15; 43/16
[58] Field of Search .............................................. 43/15, 16

[56] References Cited

U.S. PATENT DOCUMENTS

| | | |
|---|---|---|
| 716,726 | 12/1902 | Leib . |
| 796,948 | 8/1905 | Tuttle . |
| 876,732 | 1/1908 | Schmidt . |
| 916,891 | 3/1909 | Schildbach . |
| 1,045,177 | 11/1912 | Pluschke . |
| 1,549,405 | 8/1925 | Bjurstrom . |
| 1,957,853 | 5/1934 | Sibley . |
| 1,996,704 | 4/1935 | Hawkinson . |
| 2,008,482 | 7/1935 | Wolf . |
| 2,204,560 | 6/1940 | Allison . |
| 2,295,250 | 9/1942 | Zenewich . |
| 2,640,290 | 6/1953 | Ames et al. . |
| 2,703,465 | 3/1955 | Stefano . |
| 2,744,351 | 5/1956 | Smith . |
| 2,752,716 | 7/1956 | Porter . |
| 2,781,601 | 2/1957 | Crossley . |
| 2,821,804 | 2/1958 | Smith . |
| 2,841,912 | 7/1958 | Eining . |
| 2,898,697 | 8/1959 | Housman .................................... 43/15 |
| 2,918,746 | 12/1959 | Hamrick . |
| 2,921,398 | 1/1960 | Cunningham . |
| 3,451,155 | 6/1969 | Huliew . |
| 3,686,785 | 8/1972 | Dixon . |
| 3,722,127 | 3/1973 | Atkins, Sr. . |
| 3,724,115 | 4/1973 | Derie . |
| 3,798,821 | 3/1974 | Bybee ......................................... 43/15 |
| 3,863,379 | 2/1975 | Kobayashi .................................. 43/15 |
| 4,012,861 | 3/1977 | Gellatly . |
| 4,083,139 | 4/1978 | Schwend . |
| 4,142,315 | 3/1979 | Hoffman . |
| 4,231,178 | 11/1980 | Black .......................................... 43/16 |
| 4,235,035 | 11/1980 | Guthrie . |
| 4,321,767 | 3/1982 | Hodshire .................................... 43/15 |
| 4,344,248 | 8/1982 | Brophy , Sr. et al. . |
| 4,393,615 | 7/1983 | Hodshire .................................... 43/15 |
| 4,676,018 | 6/1987 | Kimball . |
| 4,924,617 | 5/1990 | Parent . |
| 4,941,278 | 7/1990 | Verkuil . |
| 5,274,943 | 1/1994 | Ratcliffe et al. . |
| 5,363,582 | 11/1994 | Walker et al. . |
| 5,483,768 | 1/1996 | Tessier . |
| 5,499,469 | 3/1996 | Guillemette . |

*Primary Examiner*—Michael J. Carone
*Assistant Examiner*—Darren Ark
*Attorney, Agent, or Firm*—Everett G. Diederiks, Jr.

[57] ABSTRACT

An automatic fish hook setting assembly includes a hook setting member that is interengaged with a fishing line following deployment of the fishing line. The hook setting member is held in a set position by a latching mechanism, against a biasing force tending to release the hook setting member. A weight transfer assembly is also engaged by the fishing line in a manner which causes the assembly to be shifted from a loaded position to an unloaded position when a force, exceeding a threshold amount, is exerted thereon through the fishing line by a fish tugging on the line. When unloaded, the weight transfer assembly abuts the latching mechanism which causes the hook setting member to be automatically released, thereby jerking the fishing line to snare the fish. The automatic fish hook setting assembly can be readily adjusted for use with various fishing styles and species of fish. In addition, a visual and/or audible indicator unit is provided in order to signal an unattending fisherman when a fish has been snared.

19 Claims, 3 Drawing Sheets

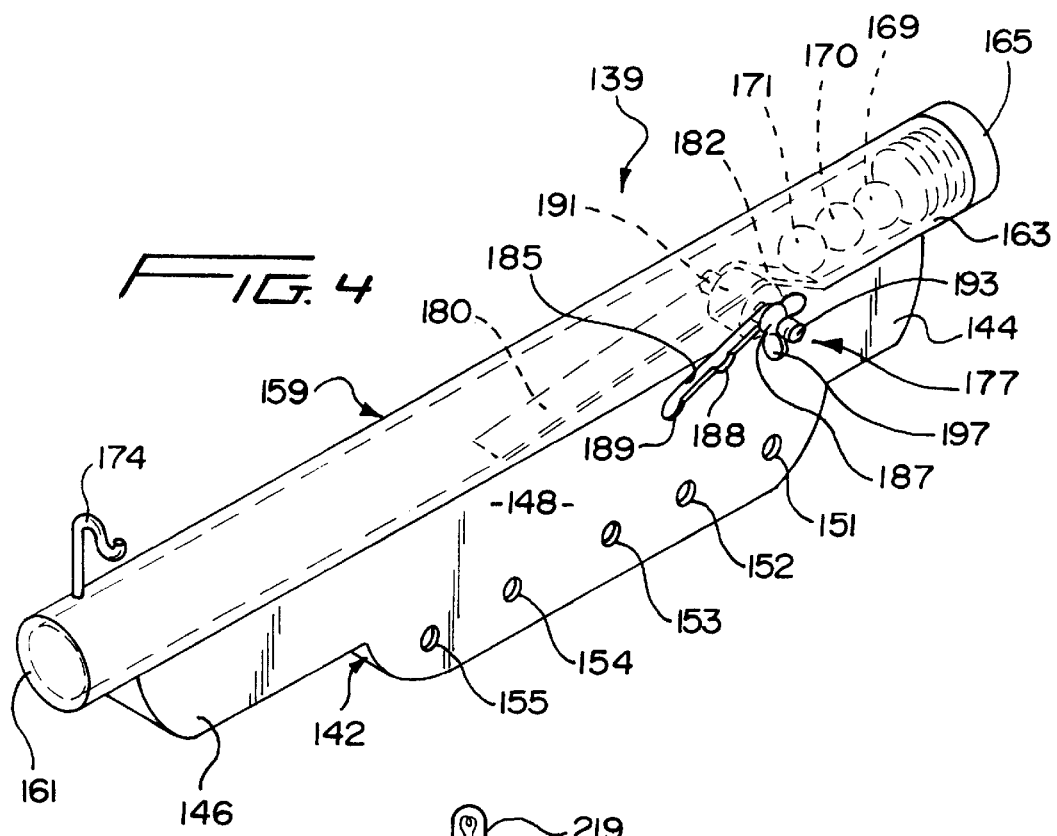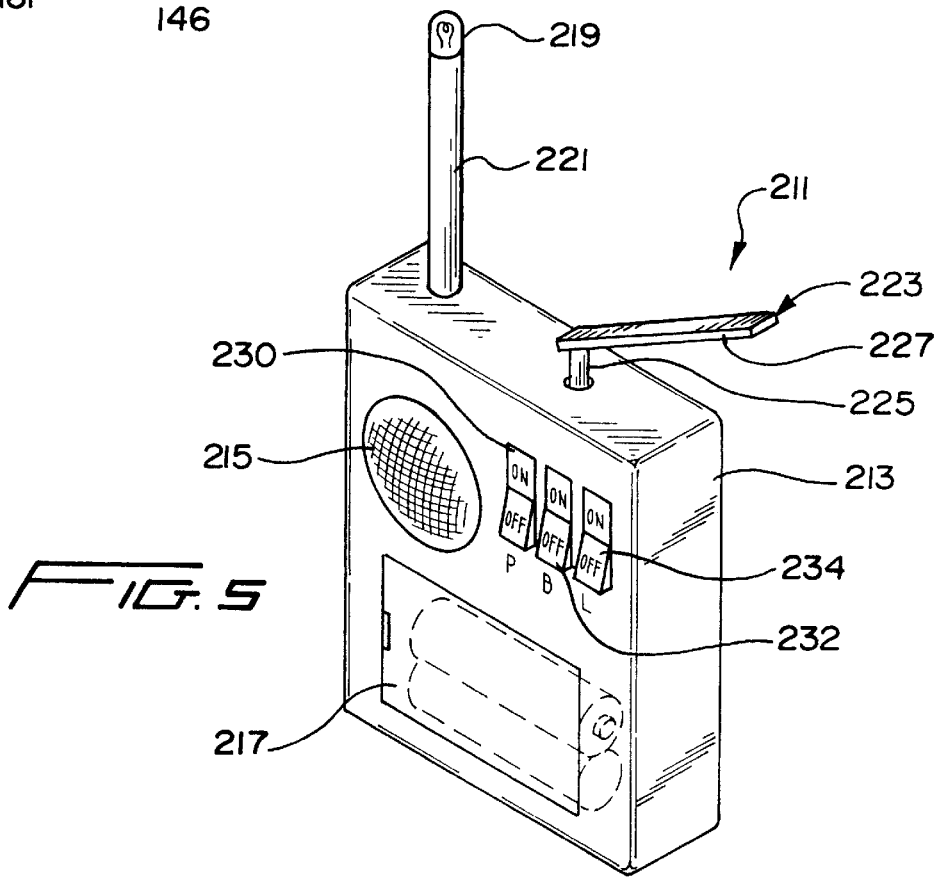

AUTOMATIC FISH HOOK SETTING ASSEMBLY

BACKGROUND OF THE INVENTION

1. Field of the Invention

The present invention pertains to the sport of fishing and, more particularly, to an assembly for automatically hooking a fish on a fishing line.

2. Discussion of the Prior Art

Devices adapted to automatically snare a fish based on the tugging of a fishing line are known in the art. In general, these devices are provided in order to enable a fisherman to leave his/her fishing pole unattended while still maintaining the ability to snare a fish. Many of these known devices constitute mechanical units which are adapted to be directly attached to or receive a fishing pole. Such arrangements are undesirable since they cannot be universally utilized with all types of fishing poles, require specific interconnecting structure and are generally considered quite cumbersome, particularly when it is desired to utilize the pole without the device.

Other known devices of this nature are adapted to only be interconnected with the fishing line and therefore have the advantages of being universally usable with various types of fishing gear and do not represent undesirably bulky attachments to the poles themselves. However, both of these known types of automatic hooking arrangements present additional disadvantages. For example, the devices are not adjustable in a way which would enable them to be used in various fishing endeavors ranging from cast fishing from a beach to trolling behind a boat. For instance, a device designed for use in connection with cast fishing from a beach, a pier or an anchored boat cannot be readily used in other types of fishing, such as when trolling behind a boat. The mere forces exerted on the fishing line due to the movement of the hook, line and sinker through the water as the boat is in motion would itself activate the snaring mechanism. In addition, the devices cannot be readily adjusted for use in effectively catching different species of fish. As essentially all of these types of devices rely upon exerting a predetermined jerking force on the fishing line or pole in order to hook the fish, the applied jerking force must be suited to the type of fish being caught such that, for example, a hard jerking force is not used in catching fish with weak mouth tissue. Finally, these known devices simply fail to present reliable systems for snaring fish.

In any event, there exists a need in the art for an automatic fish hook setting assembly which can be readily adjusted depending upon the particular type of fishing being conducted and the specific species of fish being sought such that the assembly represents a dependable system that can be relied upon to accurately snare a variety of fish with a high degree of proficiency.

SUMMARY OF THE INVENTION

The present invention pertains to an automatic fish hook setting assembly that can be readily adjusted so as to be particularly suitable in snaring various species of fish. In addition, the automatic fish hook setting assembly of the invention can be configured for effective use regardless of the manner in which the fish are being caught.

These and other features of the present invention are achieved by providing an automatic fish hook setting assembly that incorporates a first setting member that is biased by an adjustable force spring from a set position towards a release position. The first setting member is adapted to be interconnected with a section of a fishing line after the fishing line has been deployed such that, when the first setting member is moved between its set and release positions, a jerking force is transmitted to the fishing line. The first setting member is retained in its set position by a second setting member which essentially constitutes a latching mechanism. The second setting member also incorporates an adjustable element in the form of a vertically shiftable anvil member. A third setting member, that is also engaged by the fishing line, is adapted to shift and strike the anvil member thereby causing the second setting member to become unlatched and the first setting member to be released when a fish tugs on the fishing line beyond a threshold amount.

In accordance with the invention, the third setting member constitutes a weight transfer assembly that includes at least one weight transfer member adapted to be repositioned when the threshold tugging force is exceeded on the fishing line. The required threshold force can also be adjusted by means of a weight transfer resisting unit that is carried by the third setting member and provides a resistance to the repositioning of the weight transfer member.

Therefore, the automatic fish hook setting assembly of the present invention incorporates various components, with the operation of many of the components being individually adjustable in order to effectively customize the assembly for a particular use. In addition, since the assembly is designed to automatically hook a fish thereby not requiring the fisherman to constantly attend to the fishing pole, a signalling device is also provided in order to visually and/or audibly notify the user that a fish has been snared.

Additional features and advantages of the automatic fish hook setting assembly of the invention will become more readily apparent from the following detailed description of a preferred embodiment thereof when taken in conjunction with the drawings wherein like reference numerals refer to corresponding parts in the several views.

BRIEF DESCRIPTION OF THE DRAWINGS

FIG. 4 is a perspective view of a weight transfer arrangement incorporated in the automatic fish hook setting assembly of the invention; and FIG. 5 is a perspective view of a signalling device utilized in connection with the automatic fish hook setting assembly of FIG. 1.

DETAILED DESCRIPTION OF THE PREFERRED EMBODIMENT

Figure 1:
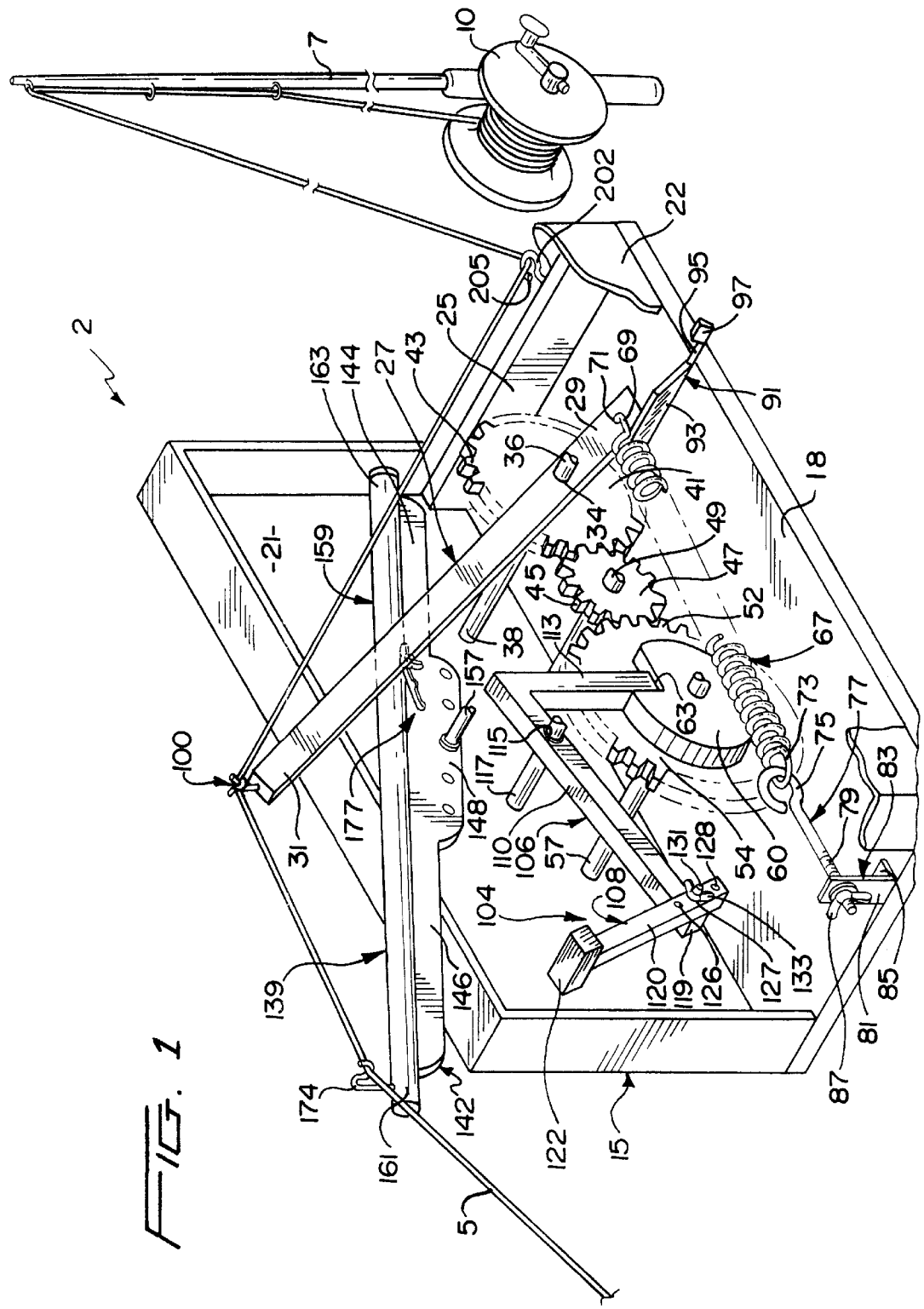
FIG. 1 is a perspective view of the automatic fish hook setting assembly of the invention.

With initial reference to FIG. 1, the automatic fish hook setting assembly of the present invention is generally indicated at 2 and is adapted to be used for snaring of fish upon a hook (not shown) carried by a fishing line 5 associated with a fishing rod 7 having a reel 10. As will become fully evident below, automatic fish hook setting assembly 2 is adapted to be used to snare a fish that tugs on the hook associated with fishing line 5 regardless of whether a fisherman applies an appropriate jerking force on fishing rod 7.

Therefore, once set, automatic fish hook setting assembly 2 is adapted to snare a fish on line 5 automatically even when fishing rod 7 is unattended. For this reason, fishing rod 7 could simply be mounted within a holder of the type known in the art during use of automatic fish hook setting assembly 2 or fishing rod 7 could remain in the hands of the fisherman.

Automatic fish hook setting assembly 2 generally includes a support frame in the form of a housing 15 that includes a base 18 and at least side wall panels 21 and 22. Additional wall panels, and even a slotted top panel, could be provided in accordance with the present invention but have not been shown in this figure in order to illustrate the internal workings of automatic fish hook setting assembly 2. As shown, a rear cross brace 25 can extend between side wall panels 21 and 22 in order to add reinforcement for frame 15. In any event, automatic fish hook setting assembly 2 includes a first setting member 27 that takes the form of a lever having a first end portion 29 and a second end portion 31. First end portion 29 is provided with a through hole 34 which receives a shaft 36. In the preferred embodiment, first setting member 27 is rotatably mounted upon shaft 36 but is not permitted to shift axially along shaft 36. Shaft 36 therefore includes ends, one of which is indicated at 38, which are fixed to side wall panels 21 and 22. With this arrangement, first setting member 27 is permitted to pivot between a set position shown in FIG. 1 and a hooking or release position as will be discussed more fully below. At this point, it should be recognized that although first setting member 27 is disclosed to rotate about an axis defined by shaft 36, it is also possible to affix first setting member 27 to shaft 36 and to rotatably mount shaft 36 to side wall panels 21 and 22 while still enabling first setting member 27 to pivot relative to support frame 15 between the set and release positions.

Fixed for rotation with first setting member 27 is a first gear 41. First gear 41 includes a plurality of peripheral teeth 43 that are interengaged with teeth 45 of a smaller, second gear 47. Second gear 47 is preferably rotatably mounted upon a shaft 49 that itself extends between side wall panels 21 and 22. Teeth 45 are interengaged with teeth 52 of a large, third gear 54 that is rotatably mounted about a shaft 57. Based on the above description, it should be readily apparent that first, second and third gears 41, 47 and 54 all rotate in unison with first setting member 27 and therefore gears 41, 47 and 52 collectively constitute a transmission unit. In addition, affixed for rotation with third gear 54 is a hub member 60 provided with a notch 63.

Figure 2:
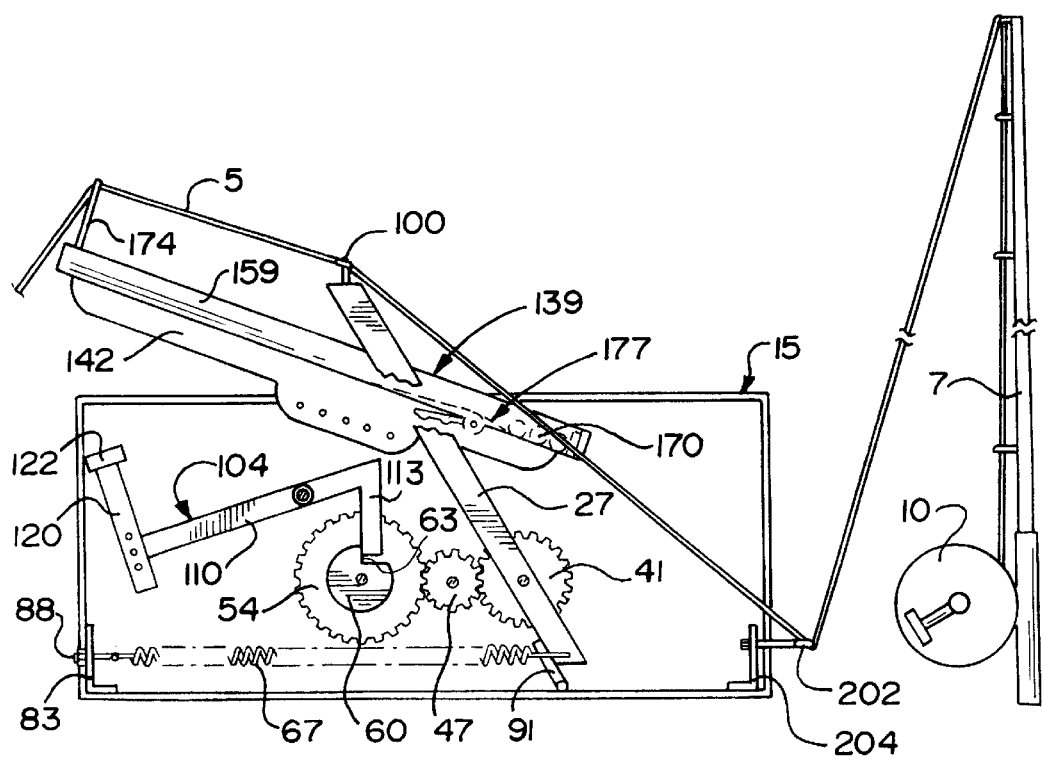
FIG. 2 is a side-view of the automatic fish hook setting assembly in a loaded/set position.
Figure 3:
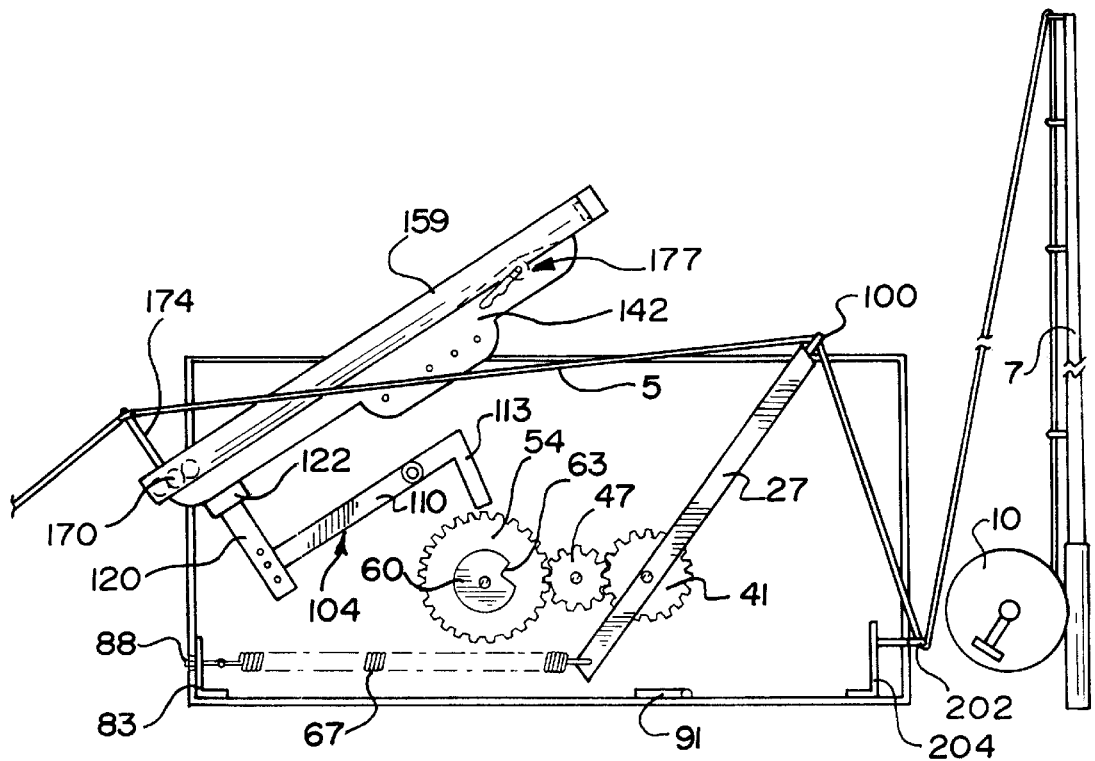
FIG. 3 is a side-view similar to that of FIG. 2 but depicting the automatic fish hook setting assembly in an unloaded/release position.

First setting member 27 is biased to rotate towards its release position. In accordance with the preferred embodiment, this biasing function is performed by a spring 67 having a first end 69 that is secured within an aperture 71 provided in first end portion 29 of first setting member 27 and a second end 73 that is connected to an eyelet 75 of a bolt element 77. As shown, bolt element 77 preferably includes a threaded shaft portion 79 that extends through a first leg 81 of a bracket 83. Bracket 83 also includes a second leg 85 that is fixedly secured to base 18 by any means known in the art. Threaded shaft 79 receives a wing nut 87 as shown in FIG. 1 (or equally a typical nut 88 as illustrated in FIGS. 2 and 3) that can be used to shift eyelet 75 relative to bracket 83 such that the tension on spring 67 is adjustable.

During loading of automatic fish hook setting assembly 2, first setting member 27 can be retained in its set position, against the biasing force of spring 67, by means of a safety member 91. Safety member 91 can take various forms in accordance with the present invention but, as shown, preferably includes a body portion 93 in the form of a plate that is adapted to abut first end portion 29 of first setting member 27 to prevent rotation of first setting member 27 out of the set position shown in FIG. 1. Body portion 93 of safety member 91 is attached to an outwardly extending shank 95 that is preferably rotatably supported by side wall panel 22. In addition, safety member 91 includes a control knob 97 that can be used to manually pivot body portion 93 to a position wherein it directly overlies base 18 after automatic fish hook setting assembly 2 is fully set. Although not shown, safety member 91 can be retained in the position shown in FIG. 1 during setting of automatic fish hook setting assembly 2 by various types of catch arrangements including permitting safety member 91 to slide relative to base support frame 15 until control knob 97 engages an outwardly extending projection (not shown) provided on side wall panel 22. As also clearly shown in FIG. 1, second end portion 31 of first setting member 27 is provided with an element 100 that is adapted to be placed in engagement with a section of fishing line 5 as will be further detailed below.

Automatic fish hook setting assembly 2 further includes a second setting member 104 that includes an L-shaped element 106 and an upstanding element 108. L-shaped element 106 includes a first leg 110 and a second leg 113. First leg 110 is provided with a through hole 115 that receives a shaft 117. Shaft 117 is attached to support frame 15 in a manner analogous to each of shafts 36, 49 and 57 and therefore enables second setting member 104 to rotate relative to support frame 15. The first leg 110 of L-shaped element 106 has an end 119 to which is secured a post member 120 of upstanding element 108. Mounted atop post member 120 is an anvil member 122. In the preferred embodiment, post member 120 is provided with a plurality of lower bores 126–128 which enables post member 120 to be vertically adjustably attached to first leg 110 of L-shaped element 106. More specifically, upstanding element 108 can be secured to L-shaped element 106 by means of a bolt 131 extending through first leg 110 and selected one of bores 126–128 and then tightening a wing nut 133 upon bolt 131. The terminal end of first leg 110 could also be provided with a cut-out section (not shown) into which post member 120 is fitted to prevent relative rotation between post member 120 and L-shaped element 106. Therefore, with the inclusion of bores 126–128, anvil member 122 can be selectively raised or lowered and vertically fixed in a desired position by bolt 131 and wing nut 133. As will be discussed more fully below, raising or lowering anvil member 122 can be used to adjust the responsiveness of automatic fish hook setting assembly 2 to a tugging force exerted on fishing line 5 beyond a threshold amount.

Automatic fish hook setting assembly 2 also includes a third setting member 139 that preferably constitutes a weight transfer assembly. As best shown in FIGS. 1 and 4, third setting member 139 includes a support member 142 including a first end portion 144 and a second end portion 146 which are connected by an intermediate portion 148. Intermediate portion 148 is provided with a plurality of longitudinally spaced mounting holes 151–155 which are adapted to individually receive a shaft 157 used to rotatably mount third setting member 139 relative to support frame 15. Upon support member 142 is a tubular member 159 having a closed end 161 and an open end 163. In the embodiment shown, open end 163 is preferably internally threaded and is adapted to threadably receive a cap 165 to selectively close off end 163. Tubular member 159 is adapted to receive one or more weight transfer members 169–171 which, in the preferred embodiment, take the form of steel balls. As will be discussed more fully below, weight transfer members 169–171 are utilized in accordance with the present invention to automatically rotate third setting member 139 relative to support frame 15 when a fish tugs on fishing line 5 beyond a threshold amount. In order that third setting member 139 can be sensitive to the force exerted on fishing line 5 by a fish, a line guiding element 174 is provided atop tubular member 159 adjacent closed end 161.

Third setting member 139 also preferably incorporates a weight transfer resisting unit 177. In the preferred embodiment shown in detail in FIG. 4, weight transfer resisting unit 177 is characterized by a pliable strip 180 that constitutes a lower section of tubular member 159. Pliable strip 180 can be configured to define an inclining surface 182 over which weight transfer members 169–171 must traverse in order to shift from end 163 to end 161 of tubular member 159. Weight transfer resisting unit 177 also includes a slot 185 formed in support member 142 with slot 185 being inclined upwardly towards open end 163. Slot 185 is provided with a plurality of spaced notches 187–189. A roller member 191 is received upon a rod 193 that extends into slot 185 and which threadably receives a wing nut 197. With this arrangement, the shifting of rod 193 within slot 185 functions to re-position roller member 191 which, correspondingly adjusts the inclination angle of pliable strip 180. Clearly, the greater the inclination angle of pliable strip 180, the more difficult it is for weight transfer members 169–171 to be shifted within tubular member 159. As will be discussed more filly below, weight transfer resisting unit 177 is provided to selectively adjust the sensitivity of automatic fish hook setting assembly 2 in order to enable automatic fish hook setting assembly 2 to be effectively used in snaring a wide variety of fish species.

During use of automatic fish hook setting assembly 2, fishing rod 7 will be generally used to initially cast fishing line 5 and then fishing line 5 would be guided onto line guiding element 174 of third setting member 139 and line engaging member 100. Actually, fishing line 5 would be releasably fixed at line engaging member 100 following deployment of fishing line 5 a desired amount such as by wrapping fishing line 5 about line engaging member 100 a few times (see the single loop shown in FIG. 1). As shown in FIGS. 1–3, fishing line 5 can be guided through an eyelet 202 that is either attached to rear cross brace 25 as shown in FIG. 1 or to a separate L-shaped bracket 204 as depicted in FIGS. 2 and 3. In any event, eyelet 202 has an associated line receiving opening 205 which enables fishing line 5 to be readily attached and released therefrom. Of course, prior to attachment of line 5 to automatic fish hook setting assembly 2, automatic fish hook setting assembly 2 would be placed into its loaded/set position as shown in FIGS. 1 and 2. This would be accomplished by initially pivoting first setting member 27 to the position shown in FIG. 1 and then setting safety member 91. Pivoting of first setting member 27 will cause rotation of first, second and third gears 40, 47 and 54, as well as hub member 60. Of course, the pivoting of first setting member 27 must be performed against the biasing force of spring 67. Once notch 63 of hub member 60 is arranged in the position shown in these figures, second setting member 104 can be positioned such that second leg 113 comes into engagement with notch 63. Thereafter, first setting member 27 will be latched in its set position by second setting member 104. Although not shown, structure could be provided to lightly bias second setting member 104 into this latching position with notch 63 such as, for example, providing a coil spring on shaft 117 that engages first leg 110. During the setting of automatic fish hook setting assembly 2, third setting member 139 will be placed in a loaded position shown in FIGS. 1 and 2 wherein closed end 161 of tubular member 159 is positioned vertically higher than open end 163. Through experience, the user of automatic fish hook setting assembly 2 will have preset the height of anvil member 122, selected a suitable hole 151–155 about which third setting member 139 will rotate and will also determine the number of weight transfer members 169–171 that are placed within tubular member 159. Furthermore, weight transfer resisting unit 177 will be adjusted to determine the inclination angle of pliable strip 180.

Once set in this manner, safety member 91 can be released in order to place automatic fish hook setting assembly 2 in its fully operational position. During use, when a fish tugs on fishing line 5 beyond a threshold amount determined by the positioning of weight transfer resisting unit 177 and the particular hole 151–155 utilized, the selected number of weight transfer members 169–171 will be caused to move towards end 161 of tubular member 159. This shifting in weight will cause third setting member 139 to rotate relative to support frame 15, thereby causing support portion 142 of third setting member 139 to directly engage anvil member 122. This unloading of third setting member 139 and abutment of anvil member 122 will cause second setting member 104 to be shifted from the latching position shown in FIGS. 1 and 2 to the unlatching position shown in FIG. 3. Once this unlatching occurs, the biasing force of spring 67 will automatically cause first setting member 27 to be shifted from the set position shown in FIGS. 1 and 2 to the release position shown in FIG. 3. This movement of first setting member 27 will create an abrupt jerking upon fishing line 5 which, in turn, will function to set the hook and snare the fish. This jerking force can be adjusted in accordance with the present invention by the simple rotating of wing nut 87. Once the fish is snared, fishing line 5 can be easily released from automatic fish hook setting assembly 2 for reeling in of the fish.

From the above description, it should be readily apparent that the automatic fish hook setting assembly 2 of the present invention can be effectively utilized in automatically snaring various types of fish species. More specifically, the biasing force created by spring 67 can be readily adjusted depending upon the type of fish being caught. For example, a rather light jerking force would be pre-set when catching certain fish with weak jaws in order to avoid the undesirable occurrence of the hook being simply ripped through a mouth portion of the fish. In addition, such as when first attempting to catch larger fish or when trolling, it would be desirable to shift the axis about which third setting member 139 rotates towards hole 155 and to perhaps adjust weight transfer resisting unit 177 such that minor forces transferred to third setting member 139 by fishing line 5 will not be enough to cause the weight transfer members 169–171 to shift towards end 161 of tubular member 159. Light forces can simply act on fishing line 5 during rougher seas or when simply trolling and therefore automatic fish hook setting assembly 2 can be effectively set depending upon the conditions of fishing and the type of fish being caught.

Since the present invention enables fish to be automatically snared, the user of automatic fish hook setting assembly 2 need not maintain a post at fishing rod 7 during use of the assembly. Therefore, automatic fish hook setting assembly 2 could be set and the fisherman could leave the rod 7 unattended, even going below deck if on a boat. However, in order to provide a signal upon the release of automatic fish hook setting assembly 2 beyond the audible noise created by the movement of first, second and third setting members 27, 104 and 139, the present invention also contemplates including a signalling device generally indicated at 211 in FIG. 5. The signalling device 211 includes a control housing 213 that incorporates a speaker 215, a battery compartment 217, a visual indicator in the form of a light 219 that is provided atop an extension 221 and an activating member 223. Activating member 223 includes a shaft 225 that extends out of control housing 213 and a control lever portion 227. In the preferred embodiment, rotation of activating member 223 about a vertical axis defined by shaft 225 will function to activate signalling device 211. During use, signalling device 211 is adapted to be positioned within frame 15 such that at least one of the movable elements of automatic fish hook setting assembly 2 causes rotation of activating member 223 when a fish is snared. In accordance with the preferred embodiment, signalling device 211 is positioned with control lever 227 adjacent first end portion 29 of first setting member 27 such that, when first setting member 27 is pivoted from its set position to its release position, it will abut control lever 227 to activate signalling device 211. For control purposes, signalling device 211 preferably includes a power switch 230, an audible signal (beep) activating switch 232 and a light switch 234. Therefore, signalling device 211 can be utilized in accordance with the present invention to signal the snaring of a fish and to indicate the need to reel in the fish.

Although described with respect to a preferred embodiment of the invention, it should be understood that various changes and/or modifications can be made to the invention without departing from the spirit thereof. For example, although a transmission unit including a plurality of gears is incorporated in the preferred embodiment, the second setting member could be interconnected to the first setting member in various ways while still performing the desired latching/unlatching function described. In general, the invention is only intended to be limited by the scope of the following claims.

I claim:

1. An automatic fish hook setting assembly comprising:

a first setting member movable between a set position and a hooking position;

an element biasing said first setting member towards said hooking position;

a second setting member supported for movement between a latching position wherein said second setting member is interconnected with said first setting member in order to retain said first setting member in said set position and an unlatching position wherein said second setting member releases said first setting member;

a third setting member movable between loaded and unloaded positions with said third setting member exerting an unlatching force upon said second setting member when shifted to said unloaded position; and at least one weight transferring member supported by said third setting member for movement relative to said third setting member, wherein said first and third setting members are adapted to be placed in contact with a fishing line having a hook to be set when said first setting member is in said set position, said second setting member is in said latching position and said third setting member is in said loaded position such that, upon tugging on the fishing line by a fish with a force causing shifting of said at least one weight transferring member relative to said third setting member beyond a threshold amount, said third setting member is forced to shift from said loaded position to said unloaded position which causes said second setting member to assume said unlatching position thereby permitting the first setting member to jerk the fishing line while moving to said hooking position in order to automatically set the hook.

2. The automatic fish hook setting assembly according to claim 1, further comprising a support frame, said first setting member having first and second end portions with the first end portion of said first setting member being rotatably supported by said support frame for pivotable movement between said set and hooking positions, the second end portion of said first setting member being adapted to be engaged by the fishing line.

3. The automatic fish hook setting assembly according to claim 2, wherein said biasing element acts between said support frame and the first end portion of said first setting member.

4. The automatic fish hook setting assembly according to claim 2, wherein said second setting member includes first and second end portions with the first end portion of said second setting member defining an anvil member and said second end portion defining a latching member, said latching member being selectively interconnected with said first setting member to retain said first setting member in said set position.

5. The automatic fish hook setting assembly according to claim 4, wherein said anvil member is vertically adjustable.

6. The automatic fish hook setting assembly according to claim 4, further comprising a transmission unit interconnecting said second setting member with said first setting member.

7. The automatic fish hook setting assembly according to claim 6, wherein said transmission unit includes a plurality of interengaged gears, one of said interengaged gears being mounted for movement in unison with said first setting member.

8. The automatic fish hook setting assembly according to claim 4, wherein said third setting member includes first and second end portions spaced by an intermediate portion, said third setting member being rotatably attached to said support frame at said intermediate portion.

9. The automatic fish hook setting assembly according to claim 8, wherein said intermediate portion includes a plurality of longitudinally spaced mounting holes, said third setting member being rotatable about an axis defined by a selective one of said longitudinally spaced mounting holes.

10. The automatic fish hook setting assembly according to claim 8, further comprising an adjustable weight transfer resisting unit, attached to said third setting member, for adjusting the threshold amount necessary to shift said at least one weight transferring member relative to said third setting member.

11. The automatic fish hook setting assembly according to claim 10, wherein said third setting member includes a tube within which said at least one weight transferring member is shiftably positioned.

12. The automatic fish hook setting assembly according to claim 1, further comprising an adjustable weight transfer resisting unit, carried by said third setting member, for adjusting the threshold amount necessary to shift said at least one weight transferring member relative to said third setting member.

13. The automatic fish hook setting assembly according to claim 1, further comprising a signalling device adapted to provide at least one of an audible and a visual indication when said automatic fish hook setting assembly has been released.

14. An automatic fish hook setting assembly comprising:

a support frame;

a hook setting member connected to said support frame for movement between a set position and a hooking position, said hook setting member being adapted to be engaged by a first section of a fishing line;

means for biasing said hook setting member to said hooking position;

a latching mechanism mounted to said supporting frame for movement between a latching position wherein said latching mechanism retains said hook setting member in said set position against a force created by said biasing means and an unlatching position wherein said latching mechanism releases said hook setting member; and means, engaged by a second section of the fishing line, for automatically shifting said latching mechanism to its unlatching position upon a tugging on the fishing line by a fish beyond an adjustable threshold amount, thereby causing said hooking member to jerk the fishing line while moving to said hooking position in order to automatically set a hook attached to the fishing line, said means for automatically shifting including an adjustable weight transfer assembly rotatably attached to said support frame for movement between loaded and unloaded positions, said weight transfer assembly including first and second end portions, with the first end portion being adapted to be engaged by the second section of the fishing line, and at least one weight member which is located at the second end portion of said weight transfer assembly when said weight transfer assembly is in its loaded position and shifted to the first end portion of said weight transfer assembly as said weight transfer assembly is unloaded.

15. The automatic fish hook setting assembly according to claim 14, wherein the first end portion of said weight transfer assembly, when unloaded, directly engages said latching mechanism to shift said latching mechanism to said unlatching position.

16. The automatic fish hook setting assembly according to claim 14, further comprising means for adjusting the threshold amount needed to cause said latching mechanism to be shifted to the unlatching position.

17. The automatic fish hook setting assembly according to claim 14, further comprising a safety member for selectively retaining said hook setting member in said set position regardless of whether said latching mechanism is in said latching or unlatching positions.

18. A method of automatically setting a fish hook comprising:

positioning a hook setting member, that is adapted to be engaged by a first section of a fishing line, in a set position;

positioning a latch member in a latching position in order to retain said hook setting member in said set position;

placing a shiftable weight transfer assembly in a loaded position;

directly engaging each of the weight transfer assembly and the hook setting member with respective sections of the fishing line;

directly shifting the weight transfer assembly to an unloaded position through a tugging of the fishing line by a fish beyond a threshold amount;

shifting the latch member to an unlatched position thereby releasing said hook setting member from said set position when said weight transfer assembly is unloaded; and automatically causing said hook setting member to jerk the fishing line upon release of said latching member.

19. A method of automatically setting a fish hook according to claim 18, further comprising: adjusting the threshold amount which must be overcome by the tugging on the fishing line by the fish to cause shifting of the weight transfer assembly.

* * * * *